United States Patent
He et al.

(10) Patent No.: US 8,368,832 B2
(45) Date of Patent: Feb. 5, 2013

(54) LCD PANEL AND METHOD FOR MANUFACTURING THE SAME

(75) Inventors: Chengming He, Shenzhen (CN); Shihchyn Lin, Shenzhen (CN)

(73) Assignee: Shenzen China Star Optoelectronics Technology Co., Ltd., Guangdong (CN)

( * ) Notice: Subject to any disclaimer, the term of this patent is extended or adjusted under 35 U.S.C. 154(b) by 279 days.

(21) Appl. No.: 13/000,381

(22) PCT Filed: Nov. 4, 2010

(86) PCT No.: PCT/CN2010/078435
§ 371 (c)(1),
(2), (4) Date: Dec. 21, 2010

(87) PCT Pub. No.: WO2012/040946
PCT Pub. Date: Apr. 5, 2012

(65) Prior Publication Data
US 2012/0075546 A1 Mar. 29, 2012

(30) Foreign Application Priority Data
Sep. 28, 2010 (CN) .......................... 2010 1 0295186

(51) Int. Cl.
*G02F 1/136* (2006.01)
*G02F 1/1333* (2006.01)
(52) U.S. Cl. ................. 349/43; 349/44; 349/54
(58) Field of Classification Search ............. 349/43, 349/44, 54
See application file for complete search history.

(56) References Cited

U.S. PATENT DOCUMENTS
6,980,268 B2 * 12/2005 You ............................. 349/113

FOREIGN PATENT DOCUMENTS
| CN | 101089714 A | 12/2007 |
|---|---|---|
| CN | 101257028 A | 9/2008 |
| CN | 101762912 A | 6/2010 |
| JP | 10311988 A | * 11/1998 |
| JP | 2005236191 A | 9/2005 |
| JP | 2008203761 A | 9/2008 |
| JP | 2010182760 A | 8/2010 |

* cited by examiner

*Primary Examiner* — Mike Qi
(74) *Attorney, Agent, or Firm* — Digghavong Mori & Steiner, P.C.

(57) ABSTRACT

The present invention discloses a liquid crystal display (LCD) panel and the method for manufacturing the same. A transparent electrode layer serving as a pixel electrode is laid out and simultaneously, a transparent electrode layer is laid out on top of a thin-film transistor (TFT) acting as a shift register. The transparent electrode layer can mask the influence of the common voltage of the common voltage electrode layer on the TFT. Therefore, the shift in the I-V characteristics of the TFT can be prevented due to the common voltage of the common voltage electrode layer. In this way, not only power consumption of the TFT in operation can be reduced to increase the life span of the TFT, but also power chips can be prevented from malfunctioning due to an overabundant flow of electric current which causes display abnormality.

14 Claims, 8 Drawing Sheets

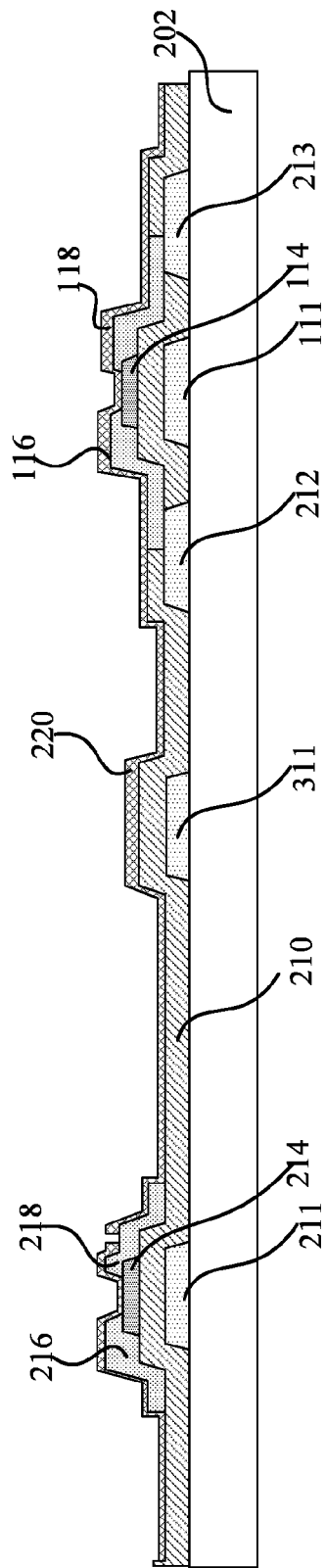
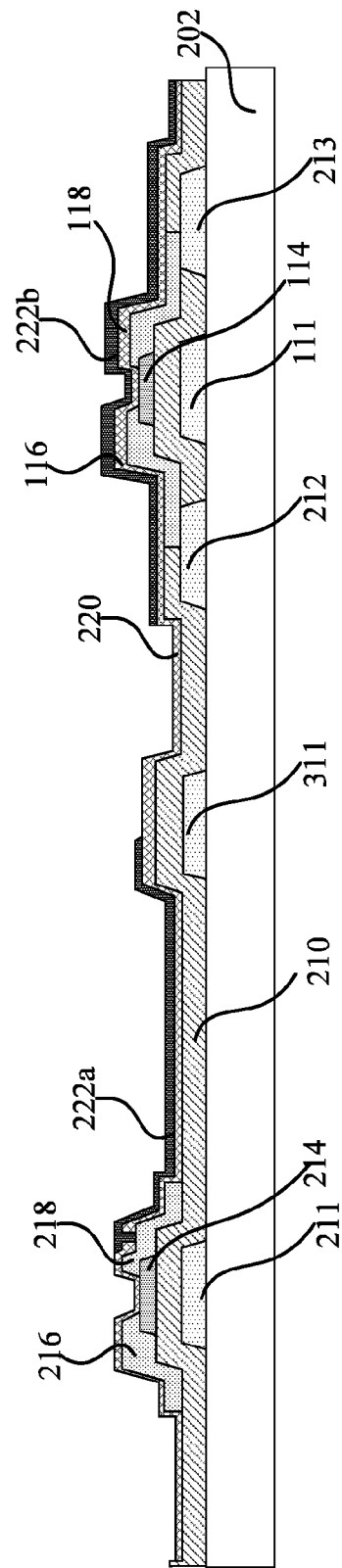
Fig. 6
Fig. 7

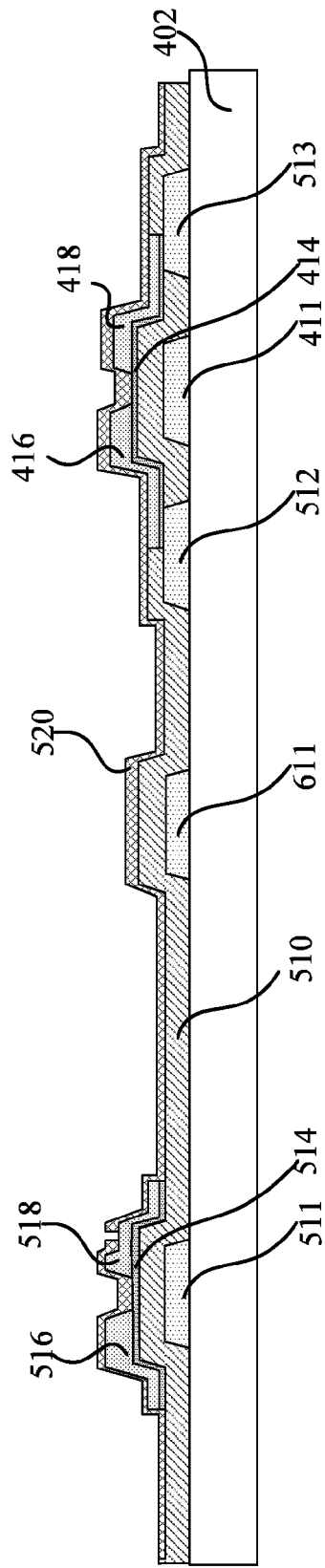
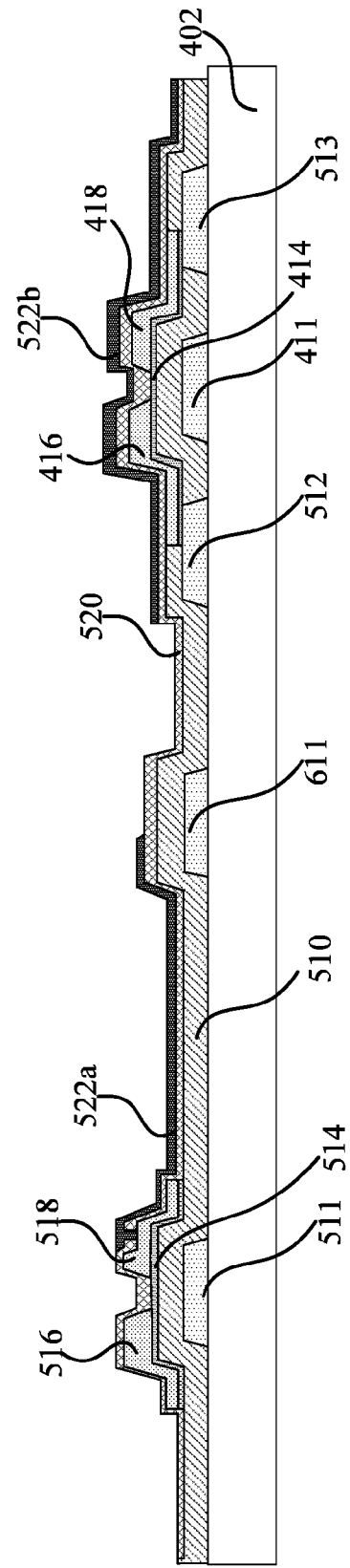
Fig. 12
Fig. 13

LCD PANEL AND METHOD FOR MANUFACTURING THE SAME

BACKGROUND OF THE INVENTION

1. Field of the Invention

The present invention relates to a liquid crystal display (LCD) panel and a manufacturing method thereof, and more particularly, to an LCD panel and a manufacturing method thereof capable of preventing a voltage of an upper glass substrate from affecting amorphous silicon thin-film transistors (a-Si TFTs) by directly covering a conducting layer on a shift register using a-Si TFTs.

2. Description of Prior Art

An LCD panel of a conventional LCD comprises a plurality of pixels. Each pixel comprises three pixel units representing the three primary colors of light—Red (R), Green (G), and Blue (B). A gate driver outputs a scan signal which activates each TFT of the pixel units in each row to be turned on in sequence. Meanwhile, a source driver outputs corresponding data signals to the pixel units in a straight row. The pixel units obtain their individually required voltage at full charge to display different gray levels. The gate driver outputs a scan signal row by row to turn on each TFT of the pixel units in each row. Then, the source driver charges/discharges the turned-on pixel units in each row. Based on this sequence, all of the pixel units on the LCD panel are charged. After all of the pixel units are completely charged, the pixel units in the first row start to be charged again.

In a current LCD design, a gate driver comprises a shift register is used to output a scan signal to the LCD panel for every fixed time interval. For a gate driver adopting the a-Si TFT process, however, the shift register can be directly placed on a glass substrate. But, after the LCD panel is illuminated, the LCD panel often shows abnormalities due to a shift in the I-V characteristics of the TFTs. One reason is that the voltage applied on the upper glass substrate may affect the TFTs of the shift register, bringing about the shift in the threshold voltage of the TFTs. Consequently, the TFTs cannot effectively work and the life span of the TFTs is affected as well. Besides, the shift in the I-V characteristics of the TFTs can easily cause a power chip on a printed circuit board (PCB) to malfunction due to an overabundant flow of electrical current, resulting in display abnormality.

SUMMARY OF THE INVENTION

It is an object of the present invention to provide an LCD panel and a manufacturing method thereof capable of preventing a voltage of an upper glass substrate from affecting amorphous silicon thin-film transistors (a-Si TFTs) by directly covering a conducting layer on a shift register using a-Si TFTs.

According to the present invention, a liquid crystal display (LCD) panel comprises a display region and a non-display region. The LCD panel further comprises a glass substrate, a plurality of first thin-film transistors (TFTs), a plurality of second TFTs, a passivation layer, a first transparent electrode layer, and a second transparent electrode layer. The plurality of first thin-film transistors (TFTs) are placed on the non-display region of the glass substrate. Each first TFT comprises a gate, an insulating layer on the gate, a semiconductor layer on the insulating layer, a source and a drain on the semiconductor layer and on the insulating layer. The plurality of second TFTs is placed on the display region of the glass substrate. Each second TFT comprises a gate, an insulating layer on the gate, a semiconductor layer on the insulating layer, a source and a drain on the semiconductor layer and on the insulating layer. The passivation layer is placed on the source and the drain of the first TFT, and on the source and the drain of the second TFT. The first transparent electrode layer is placed over the first TFT, and the passivation layer separates the first transparent electrode layer and the first TFT. The second transparent electrode layer is electrically connected to the drain or the source of the second TFT through a hole dug on the passivation layer.

In one aspect of the present invention, the first TFT comprises at least one hole formed on the insulating layer and under the source or the drain of the first TFT, and the source or the drain of the first TFT is connected to a gate, a source, or a drain of another first TFT through the hole.

In another aspect of the present invention, the first TFT comprises at least one hole formed on the insulating layer and under the source or the drain of the first TFT, the LCD panel further comprises at least one signal layer formed under the hole, and the source or the drain of the first TFT is connected to a gate, a source, or a drain of another first TFT through the hole and the signal layer.

According to the present invention, a method of manufacturing the LCD panel having a display region and a non-display region is proposed. The method comprises the following steps: supplying a glass substrate and forming a first metallic layer on the glass substrate; forming gates of a plurality of first TFTs on the non-display region and gates of a plurality of the second TFTs on the display region with the first metallic layer; forming an insulating layer on each gate of the first TFTs and on each gate of the second TFTs; forming a semiconductor layer on the insulating layer; forming a source and a drain of each first TFT, and a source and a drain of each second TFT on the semiconductor layer and the insulating layer; forming a passivation layer on the source and the drain of each first TFT, and on the source and the drain of each second TFT; and forming an ITO layer on the passivation layer and etching the ITO layer with a mask to form a first transparent electrode layer and a second transparent electrode layer, and the second transparent electrode layer is electrically connected to the drain or the source of the second TFT, and the first transparent electrode layer is placed on the first TFT with the passivation layer being between the first transparent electrode layer and the first TFT.

In contrast to prior art, the LCD panel and the manufacturing method thereof of the present invention utilize a first transparent electrode layer which is disposed on top of a first TFT acting as a shift register. The first transparent electrode layer is capable of isolating an influence of the common voltage of the common voltage electrode layer on the first TFT. Therefore, the common voltage of the common voltage electrode layer fails to cause the shift in the I-V characteristics of the TFT. In this way, not only power consumption of the TFT in operation can be reduced to increase the life span of the TFT, but also power chips can be prevented from malfunctioning due to an overabundant flow of electrical current which causes display abnormality.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

FIGS. 2-7 illustrate the processes of forming an LCD panel according to a first embodiment of the present invention.

FIGS. 9-13 illustrate the processes of forming an LCD panel according to a second embodiment of the present invention.

DETAILED DESCRIPTION OF THE PREFERRED EMBODIMENTS

Figure 1:
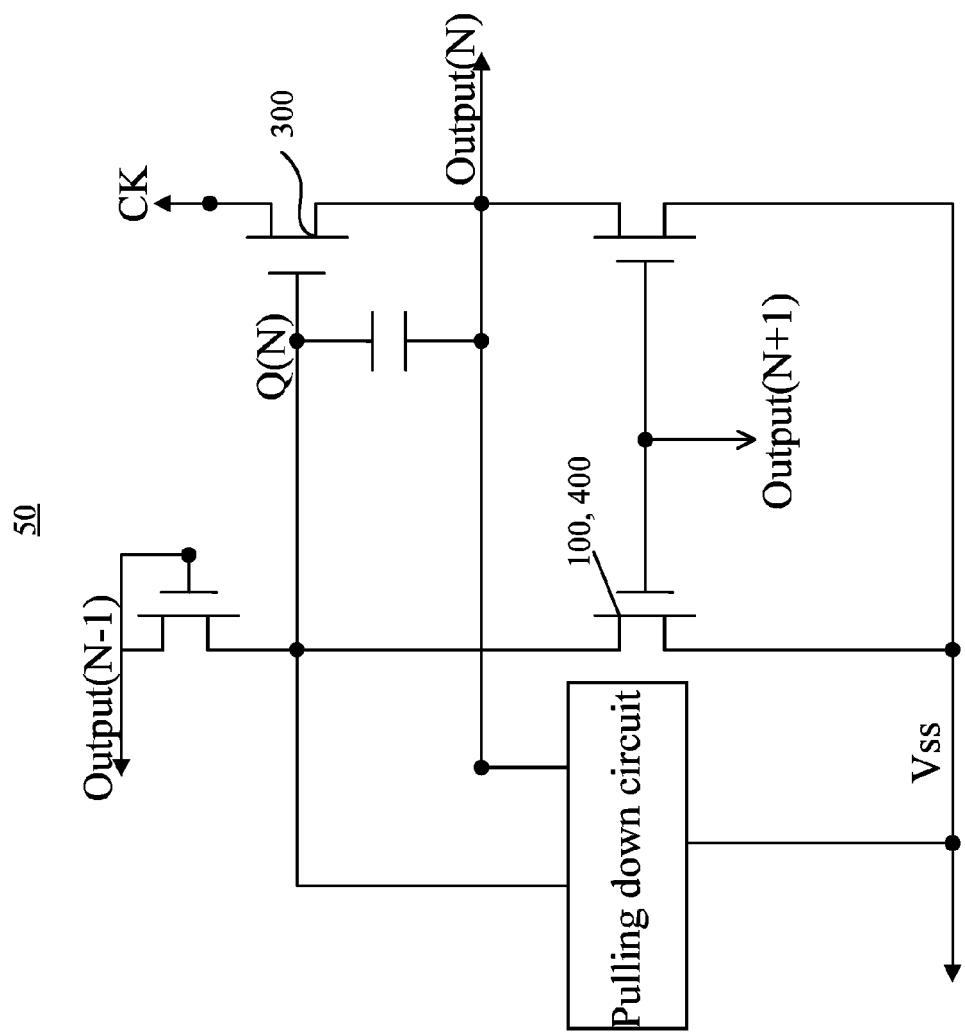
FIG. 1 is a circuit diagram of a shift register of the present invention.

The invention is described below in detail with reference to the accompanying drawings, wherein like reference numerals are used to identify like elements illustrated in one or more of the figures thereof, and in which exemplary embodiments of the invention are shown. Spatially relative terms, such as "beneath", "below", "lower", "above", "upper", "left", "right", "top", "bottom", "horizontal", "perpendicular", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 8:
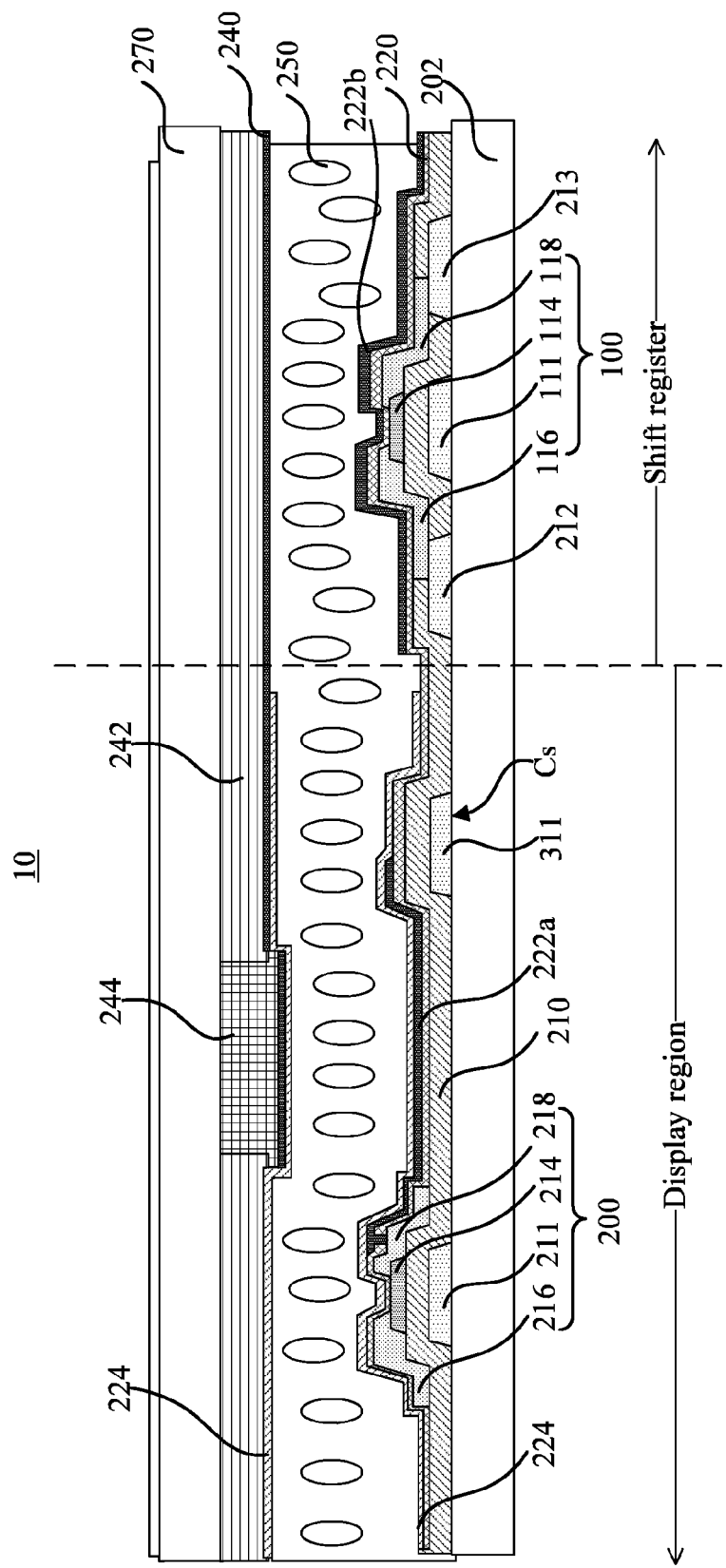
FIG. 8 is a structure diagram of the LCD panel of the present invention.

Referring to FIGS. 1 to 8, FIG. 1 is a circuit diagram of a shift register 50 of the present invention. The shift register 50 in FIG. 1 is intended for illustration purpose representing the present embodiment only and is not intended to limit the scope of this invention. Any other shift registers to which the present invention is related, are also included within the scope of this invention. FIGS. 2-7 illustrate the processes of forming an LCD panel 10 according to a first embodiment of the present invention. FIG. 8 is a structure diagram of the LCD panel 10 of the present invention. The LCD panel 10 comprises a display region and a non-display region. A plurality of TFTs 200 located on the display region is used as switches for pixel electrodes. The shift register 50 located on the non-display region outputs a scan signal for every fixed time interval. The shift register 50 comprises a plurality of TFTs. A source of the TFT 100 is connected to a gate of the TFT 300, or a gate of a TFT is connected to a drain of another TFT (not shown). According to this embodiment, both of the TFT 100 of the shift register 50 and the TFT 200 for controlling switching on the display region can be placed on the glass substrate 202. Meanwhile, the source of the TFT 100 is connected to the gate of the TFT 300 directly (or a drain of the TFT 100 connects to a gate of another TFT) without needing to use an indium tin oxide (ITO) layer. The detailed manufacturing processes are described as follows.

Figure 2:
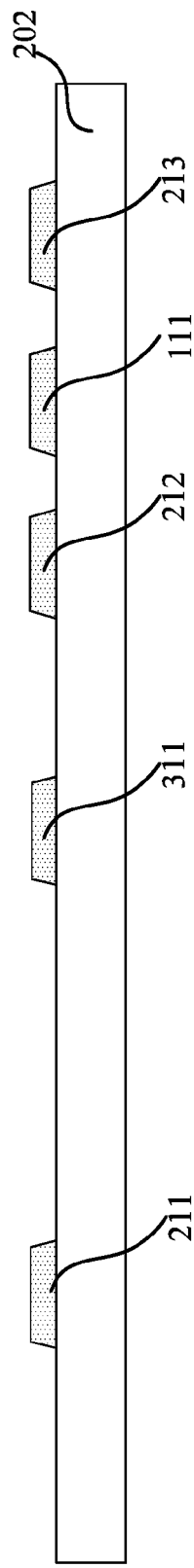

Refer to FIG. 2. At first, a glass substrate 202 serves as a lower substrate and undergoes a metallic thin film deposition process. Then, a first metallic layer (not shown) is formed on the surface of the glass substrate 202. Next, a first photo etching process (PEP) is performed on the glass substrate 202 with a first mask to form a gate 111, a gate 211, a lower electrode 311 of a storage capacitor, and signal layers 212 and 213. The signal layers 212 and 213 serving not only as a medium for conducting electrical signals, but also gates of another first TFT.

Figure 3:
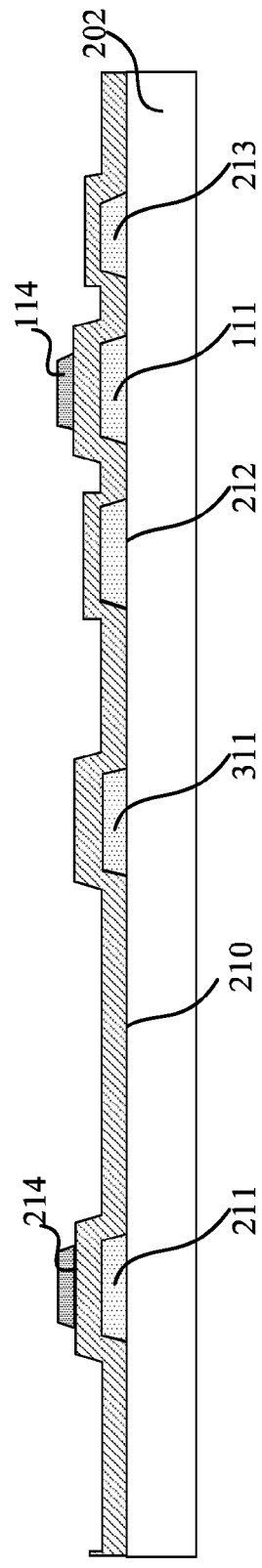
Figure 4:
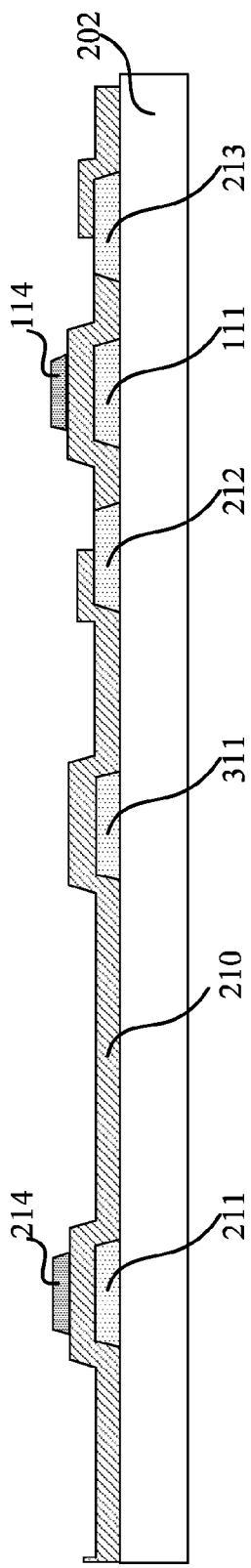

Refer to FIG. 3. A gate insulating layer 210 is deposited on and covers the gate 111, the gate 211, the lower electrode 311, and the signal layers 212 and 213. An a-Si layer is continuously deposited on the gate insulating layer 210. Then, a second PEP is performed on the gate insulating layer 210 with a second mask to form island semiconductor layers 114 and 214 or to form other structures matching the patterns of the gate 111 and the gate 211. Refer to FIG. 4. A third PEP is conducted with a third mask to remove the gate insulating layer 210 so that a plurality of holes can be formed on top of the signal layers 212 and 213.

Figure 5:
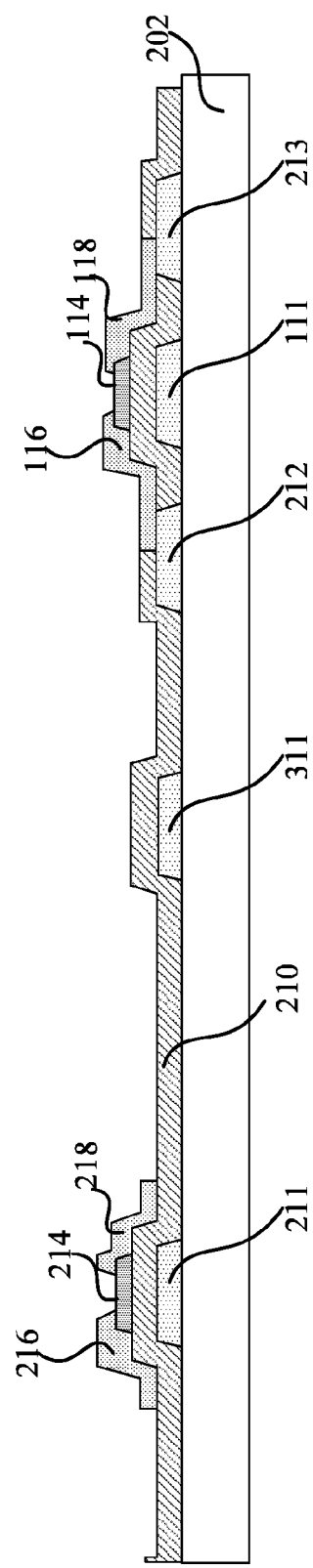

Refer to FIG. 5. A second metallic layer is formed on and entirely covers the gate insulating layer 210. A fourth PEP is conducted with a fourth mask to define a source 216, a drain 218, a source 116, and a drain 118, respectively. At this time, the source 116 is connected to the signal layer 212 through the hole, or the drain 118 is connected to the signal layer 213 through the hole. The signal layers 212 and 213 can also be electrically connected to a source, a drain, or a gate of another first TFT (not shown) on the non-display region. Therefore, the signal layers 212 and 213 can cause the source 116 or the drain 118 of the first TFT 100 to be electrically connected to a gate, a source, or a drain of other first TFTs of the shift register 50. Or, the signal layers 212 and 213 can serve as a medium for conducting electrical signals.

Refer to FIG. 6. A passivation layer 220 is deposited on and covers the sources 116 and 216, the drains 118 and 218, and the gate insulating layer 210. Next, a fifth PEP is conducted with a fifth mask to remove a part of the passivation layer 220 on top of the drain 218 until the surface of the drain 218 (or the source 216) is exposed so that a plurality of holes can be formed on top of the drain 218 (or the source 216).

Referring to FIG. 7, an ITO layer is formed on the passivation layer 220. Then, transparent electrode layers 222a and 222b are formed after the ITO layer is etched with a sixth mask. The transparent electrode layer 222a is electrically connected to the drain 218 (or the source 216) of the second TFT 200 through a plurality of holes formed in advance. The transparent electrode layer 222a serves as a pixel electrode. The transparent electrode layer 222b is placed on top of the first TFT 100. The transparent electrode layer 222b is separated from the source 116 and from the drain 118 of the TFT 100 with the passivation layer 220 to avoid short circuits. Finally, an alignment film 224 is formed on the transparent electrode layers 222a and 222b and on the passivation layer 220. The alignment film 224 can adjust LC molecules in a particular alignment.

Please refer to FIG. 8. The glass substrate 202, acting as the lower substrate, has been covered with the TFT 100, the TFT 200, and the storage capacitor Cs. And now, an LC layer 250 is injected onto the glass substrate 202. Next, a glass substrate 270 having a black matrix 242, and a color filter 244 overlaps the glass substrate 202. Another transparent electrode layer 240 covers the black matrix 242 and the color filter 244. Then, another alignment film 224 covers the transparent electrode layer 240. A common voltage is applied to the transparent electrode layer 240 which acts as a common voltage electrode layer. The rotation direction of the LC molecules of the LC layer 250 is determined according to a voltage difference between the data voltage of the transparent electrode layer 222a (pixel electrode) and the common voltage of the transparent electrode layer 240. Light transmittance is determined based on the alignment of the LC molecules of the LC layer 250. The transparent electrode layer 222b serves as a shield to prevent the TFT 100 from being influenced by the common voltage applied on the transparent electrode layer 240. Accordingly, the shift in the I-V characteristics of the TFT can be prevented.

Referring to FIGS. 9 to 14. FIGS. 9-14 illustrate the processes of forming an LCD panel 20 according to a second embodiment of the present invention. The shift register 50 comprises a plurality of TFTs, of which a source of the TFT 400 is connected to a gate of the TFT 300, or a gate of a TFT is connected to a drain of another TFT (not shown). For the present inventive LCD panel 20, both of the TFT 400 (labeled in FIG. 14) of the shift register and the TFT 500 (labeled in FIG. 14) for controlling switching on the display region can be placed on the glass substrate 402. Meanwhile, the source of the TFT 400 connects to the gate of the TFT 300 directly (or a drain of the TFT connects to a gate of another TFT) without needing a use of an indium tin oxide (ITO) layer. The detailed manufacturing processes are described as follows.

Figure 9:
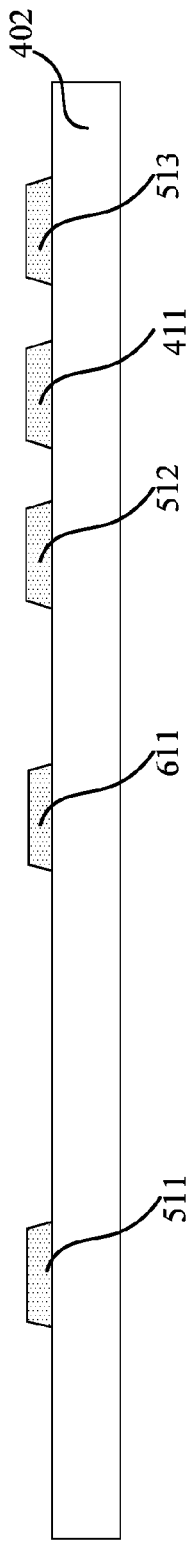

Refer to FIG. 9. At first, a glass substrate 402 serves as a lower substrate and undergoes a metallic thin film deposition process. Then, a first metallic layer (not shown) is formed on the surface of the glass substrate 402. Next, a first photo etching process (PEP) is performed on the glass substrate 402 with a first mask to form a gate 411, a gate 511, a lower electrode 611 of a storage capacitor Cs, and signal layers 512 and 513.

Figure 10:
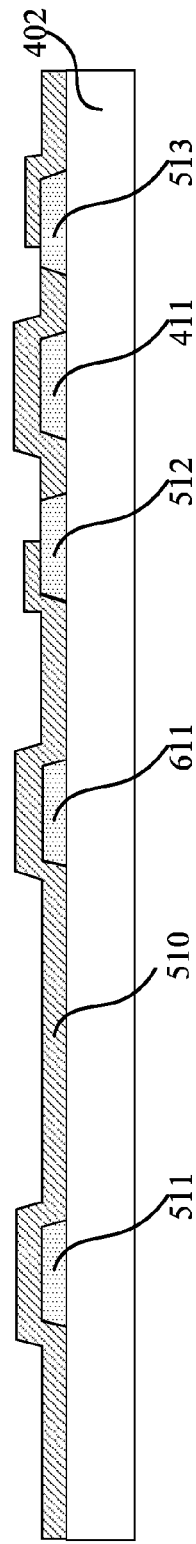
Figure 11:
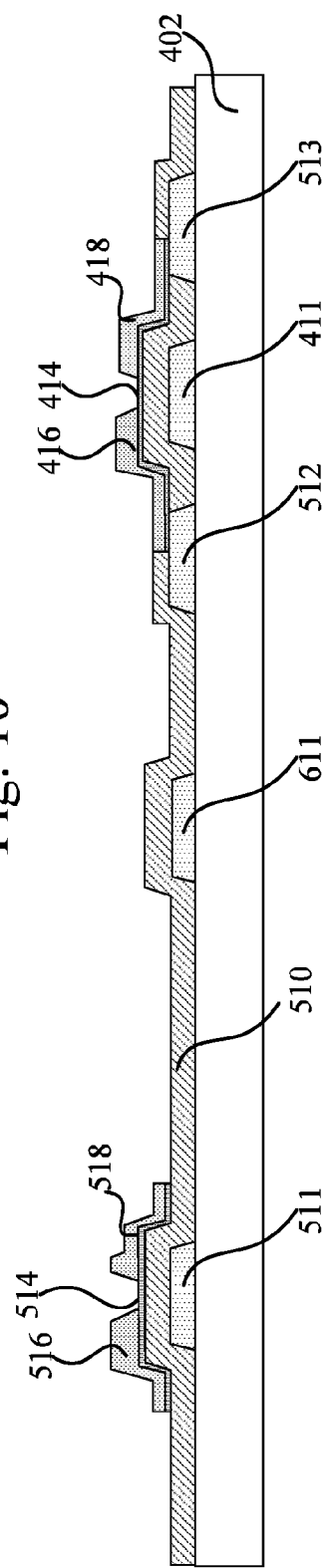

Refer to FIG. 10. A gate insulating layer 510 is deposited on and covers the gate 411, the gate 511, the lower electrode 611, and the signal layers 512 and 513. Then, a second PEP is conducted with a second mask to remove the gate insulating layer 510 so that a plurality of holes can be formed on top of the signal layers 512 and 513. Referring to FIG. 11, an a-Si layer and a second metallic layer are continuously deposited on the gate insulating layer 510. A third PEP is performed with a third mask to form island semiconductor layers 414 and 514, a source 516, a drain 518, a source 416, and a drain 418. At this moment, the signal layer 512 connects to the source 416, and the signal layer 513 connects to the drain 418. The source 416 and the drain 418 are disposed on the semiconductor layer 414, and the source 516 and the drain 518 are disposed on the semiconductor layer 514. Due to a thin thickness of the semiconductor layer 514 sandwiched between the source 416 and the signal layer 512, the source 416 is electrically connected to the signal layer 512, and the drain 418 is electrically connected to the signal layer 513. That is, the signal layers 512 and 513 form a route to electrically connect the source 416 and the source 418 to a gate, a source, or a drain of another TFT (e.g. TFT 300 in FIG. 1). Or, the signal layers 512 and 513 can serve as a medium for conducting electrical signals.

Refer to FIG. 12. A passivation layer 520 is deposited on and covers the sources 416 and 516, the drains 418 and 518, and the gate insulating layer 510. Next, a fourth PEP is conducted with a fourth mask to remove a part of the passivation layer 520 on top of the drain 518 until the surface of the drain 518 (or the source 516) is exposed so that a plurality of holes can be formed on top of the drain 518 (or the source 516).

Referring to FIG. 13, an ITO layer is formed on the passivation layer 520. Then, transparent electrode layers 522a and 522b are formed after the ITO layer is etched by a fifth PEP with a fifth mask. The transparent electrode layer 522a is electrically connected to the drain 518 (or the source 516) through a plurality of holes formed in advance. The transparent electrode layer 522a serves as a pixel electrode. The transparent electrode layer 522b is placed on top of the TFT 400. The transparent electrode layer 522b is separated from the source 416 and from the drain 418 of the TFT 400 with the passivation layer 520 to avoid short circuits. Finally, an alignment film 524 is formed on the transparent electrode layers 522a and 522b and on the passivation layer 520. The alignment film 524 can adjust LC molecules in a particular alignment.

Figure 14:
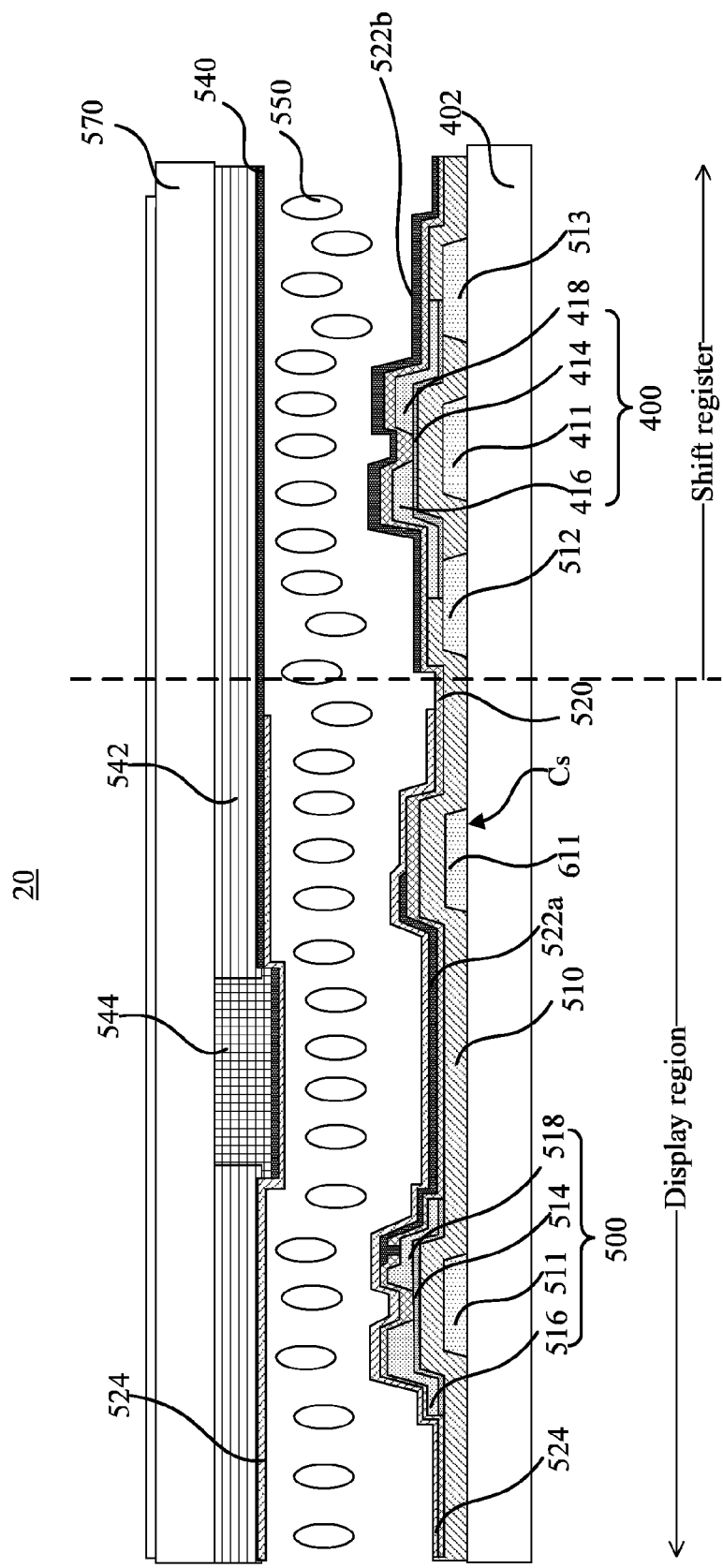
FIG. 14 illustrates a structure diagram of the LCD panel according to a second embodiment of the present invention.

Please refer to FIG. 14 illustrating a structure diagram of the LCD panel 20 according to a second embodiment of the present invention. After the TFT 400, the TFT 500, and the storage capacitor Cs are formed on the glass substrate 402, acting as the lower substrate, an LC layer 550 is injected onto the glass substrate 402. Next, a glass substrate 570 having a black matrix 542 and a color filter 544 overlaps the glass substrate 402. Another transparent electrode layer 540 covers the black matrix 542 and the color filter 544. Then, another alignment film 524 covers the transparent electrode layer 540. A common voltage is applied to the transparent electrode layer 540 which acts as a common voltage electrode layer. The rotation direction of the LC molecules of the LC layer 550 is determined according to a voltage difference between the data voltage of the transparent electrode layer 522a (pixel electrode) and the common voltage of the transparent electrode layer 540. Light transmittance is determined based on the alignment of the LC molecules of the LC layer 550. The transparent electrode layer 522b serves as a shield to prevent the TFT 400 from being influenced by the common voltage applied on the transparent electrode layer 540. Accordingly, the shift in the I-V characteristics of the TFT can be prevented.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display (LCD) panel comprising a display region and a non-display region, characterized in that, the LCD panel further comprises:
    a glass substrate;
    a plurality of first thin-film transistors (TFTs) placed on the non-display region of the glass substrate, each first TFT comprises a gate, an insulating layer on the gate, a semiconductor layer on the insulating layer, a source and a drain on the semiconductor layer and on the insulating layer, and at least a hole formed on the insulating layer and under the source or the drain;
    a plurality of second TFTs placed on the display region of the glass substrate, each second TFT comprises a gate, an insulating layer on the gate, a semiconductor layer on the insulating layer, a source and a drain on the semiconductor layer and on the insulating layer;
    a passivation layer placed on the source and the drain of the first TFT, and on the source and the drain of the second TFT;
    a first transparent electrode layer placed over the first TFT and separated by the passivation layer from the first TFT; and
    a second transparent electrode layer electrically connected to the drain or the source of the second TFT through the hole dug on the passivation layer.

2. The LCD panel of claim 1, characterized in that, the source or the drain of the first TFT is connected to a gate, a source, or a drain of another first TFT through the hole.

3. The LCD panel of claim 1, characterized in that, the LCD panel further comprises at least one signal layer formed under the hole, and the source or the drain of the first TFT is connected to a gate, a source, or a drain of another first TFT through the hole and the signal layer.

4. A liquid crystal display (LCD) panel comprising a display region and a non-display region, characterized in that, the LCD panel further comprises:
    a glass substrate;
    a plurality of first thin-film transistors (TFTs) is placed on the non-display region of the glass substrate, each first TFT comprises a gate, an insulating layer on the gate, a semiconductor layer on the insulating layer, a source and a drain on the semiconductor layer and on the insulating layer;

a plurality of second TFTs is placed on the display region of the glass substrate, each second TFT comprises a gate, an insulating layer on the gate, a semiconductor layer on the insulating layer, a source and a drain on the semiconductor layer and on the insulating layer;

a passivation layer is placed on the source and the drain of the first TFT, and on the source and the drain of the second TFT;

a first transparent electrode layer is placed over the first TFT and is separated by the passivation layer from the first TFT; and a second transparent electrode layer is electrically connected to the drain or the source of the second TFT through a hole dug on the passivation layer.

5. The LCD panel of claim 4, characterized in that, the first TFT comprises at least one hole formed on the insulating layer and under the source or the drain of the first TFT, and the source or the drain of the first TFT is connected to a gate, a source, or a drain of another first TFT through the hole.

6. The LCD panel of claim 4, characterized in that, the first TFT comprises at least one hole formed on the insulating layer and under the source or the drain of the first TFT, the LCD panel further comprises at least one signal layer formed under the hole, and the source or the drain of the first TFT is connected to a gate, a source, or a drain of another first TFT through the hole and the signal layer.

7. A method of manufacturing the LCD panel having a display region and a non-display region, the method comprising the following steps: providing a glass substrate and forming a first metallic layer on the glass substrate, characterized in that, the method further comprises:

gates of a plurality of first TFTs are formed on the non-display region with the first metallic layer and gates of a plurality of the second TFTs are formed on the display region with the first metallic layer;

an insulating layer is formed on each gate of the first TFTs and on each gate of the second TFTs;

a semiconductor layer is formed on the insulating layer;

a source and a drain of each first TFT, and a source and a drain of each second TFT are formed on the semiconductor layer and the insulating layer;

a passivation layer is formed on the source and the drain of each first TFT, and on the source and the drain of each second TFT; and an ITO layer is formed on the passivation layer and the ITO layer is etched with a mask to form a first transparent electrode layer and a second transparent electrode layer, and the second transparent electrode layer is electrically connected to the drain or the source of the second TFT, and the first transparent electrode layer is placed over the first TFT with the passivation layer being between the first transparent electrode layer and the first TFT.

8. The method of claim 7, characterized in that, the method further comprises etching the insulating layer for forming a hole under the source or the drain of the first TFT.

9. The method of claim 8, characterized in that, the step of forming the semiconductor layer, the source and the drain of the first TFT, and the source and the drain of the second TFT further comprises:

an a-Si layer is deposited on the insulating layer, and a first semiconductor layer is formed with a specific pattern and a second semiconductor layer with another specific pattern are formed by etching the a-Si layer; and a second metallic layer is formed on the insulating layer, the first semiconductor layer, and on the second semiconductor layer, and the second metallic layer is etched for forming the source and the drain of the first TFT and the source and the drain of the second TFT, the source or the drain of the first TFT being connected to a gate of another first TFT through the hole.

10. The method of claim 8, characterized in that, the step of forming the semiconductor layer, the source and the drain of the first TFT, and the source and the drain of the second TFT further comprises:

an a-Si layer and a second metallic layer are deposited on the insulating layer; and the a-Si layer and the second metallic layer are simultaneously etched to form the first semiconductor layer, the second semiconductor layer, the source and the drain of the first TFT, and the source and the drain of the second TFT, and the source or the drain of the first TFT is connected to a gate of another first TFT through the hole.

11. The method of claim 7, characterized in that, the method further comprises:

a lower electrode of a storage capacitor is formed with the first metallic layer and a signal layer is placed on the non-display region;

the insulating layer is formed on the lower electrode of the storage capacitor and the signal layer; and the insulating layer is etched to form a plurality of holes on top of the signal layer which is electrically connected to a gate of another first TFT and connected to the source or the drain of the first TFT through the hole.

12. The method of claim 11, characterized in that, the step of forming the source and the drain of the first TFT and the source and the drain of the second TFT further comprises:

an a-Si layer is deposited on the insulating layer, and the a-Si layer is etched to form a first semiconductor layer with a specific pattern and a second semiconductor layer with another specific pattern; and a second metallic layer is formed on the insulating layer, the first semiconductor layer, and the second semiconductor layer, and the second metallic layer is etched to form the source and the drain of the first TFT and the source and the drain of the second TFT, the drain or the source of the first TFT being connected to a gate, a drain, or a source of another TFT through the hole and the signal layer.

13. The method of claim 7, characterized in that, the method further comprises:

a lower electrode of a storage capacitor is formed on the first metallic layer and a signal layer is placed on the non-display region;

the insulating layer is formed on the lower electrode of the storage capacitor and the signal layer; and the insulating layer is etched to form a plurality of holes on top of the signal layer so that the source or the drain of the first TFT is electrically connected to a source or a drain of another first TFT through the hole.

14. The method of claim 13, characterized in that, the step of forming the source and the drain of the first TFT and the source and the drain of the second TFT further comprises:

an a-Si layer is deposited on the insulating layer, and the a-Si layer is etched to form a first semiconductor layer with a specific pattern and a second semiconductor layer with another specific pattern; and a second metallic layer is formed on the insulating layer, the first semiconductor layer, and the second semiconductor layer, and the second metallic layer is etched to form the source and the drain of the first TFT and the source and the drain of the second TFT, and the drain or the source of the first TFT is connected to a gate, a drain, or a source of another TFT through the hole and the signal layer.

* * * * *